United States Patent Office 2,865,706
Patented Dec. 23, 1958

2,865,706

PREPARATION OF FLUOSILANES

Frederick T. Fitch and Paul C. Miller, Baltimore, Md., assignors to W. R. Grace & Co., New York, N. Y., a corporation of Connecticut No Drawing. Application May 31, 1955
Serial No. 512,312

4 Claims. (Cl. 23—14)

This invention relates to the production of fluorinated silanes. More particularly, it relates to a method of producing fluorinated monosilanes containing one Si—H bond and having the general formula $SiHCl_xF_y$, where $x$ and $y$ are whole numbers equal to 1 or 2, and the sum of $x$ and $y$ is equal to 3.

The present invention provides a novel method of producing fluorinated chloromonosilanes, which are valuable intermediates in the preparation of siloxanes. The greater susceptibility of chloride over fluoride substituents on the silicon atom to hydrolysis has been well established and makes these compounds particularly valuable.

It is well known that chloromonosilanes can be prepared by passing HCl gas in contact with silicon metal at about 300°–400° C. We have found that chlorinated monosilanes of varying degrees of fluorination may be simply and conveniently prepared by simultaneously contacting a silicon metal-containing mass with hydrogen chloride and silicon tetrafluoride at temperatures above those indicated for the reaction between silicon and hydrogen chloride alone to form chlorinated silanes. The resulting fluorinated silanes $SiHCl_2F$ and $SiHClF_2$, may be separated from the other products of the reaction, which include the silicon chlorofluorides, by low temperature distillation.

Our novel method is carried out by passing gaseous hydrogen chloride and silicon tetrafluoride over a finely divided silicon metal-containing mass at a temperature of at least 385° C. and usually not above 525° C. The resulting gaseous reaction products are condensed in a low temperature zone or trap maintained below about −78° C., and $SiHCl_2F$ and $SiHClF_2$ are separated therefrom by fractionation.

The chemical reactions involved are many and complex. However, they may be illustrated generally by the following unbalanced equation:

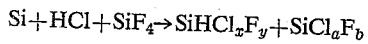

where $x$ and $y$ are 1 or 2 and the sum of $x$ and $y$ is 3, and $a$ and $b$ are 0 to 4 and their sum is 4. The formation of these monosilanes, containing the Si—H linkage, may be controlled by varying the relative proportions of hydrogen chloride and silicon tetrafluoride in the gaseous reaction mixture, as shown hereafter. The success of the process is dependent upon the absence of oxidizing gases and moisture in the reaction zone.

The present method contemplates the use of finely divided silicon metal or a finely divided silicon metal-containing mass, such as ferrosilicon, an alloy of silicon with copper, nickel, cobalt, antimony, phosphorus, or other promoter metal alone or in combination. In general, alloys of silicon with any of the metals of the fifth to the eighth group are satisfactory. The art is replete with references to improved silicon masses which may be used in the preparation of silanes and such masses are also within the contemplation of the present invention. In any event these silicon metal-containing materials are finely divided and made up of particles of fairly uniform size, usually through 8 and on 40 or on 60 mesh screen.

The silicon metal-containing mass is preliminarily heated to a temperature above about 385° C. after which hydrogen chloride and silicon tetrafluoride gases are contacted therewith. The desired elevated temperature is maintained during contact. The process is generally carried out at temperatures between about 385° and 525° C., although we have found the best yield of $SiHCl_2F$ and $SiHClF_2$ are obtained at temperatures between about 400° and 500° C. Below 385° C., the products are chlorosilanes and there is substantially no formation of fluorinated chloromonosilanes.

In accordance with our method, hydrogen chloride and silicon tetrafluoride gases are simultaneously contacted with the silicon. The gases may be introduced into the reactor containing silicon from separate streams, but we prefer to pre-mix hydrogen chloride and silicon tetrafluoride and introduce the gases in a single stream. In some instances it may prove desirable to dilute the gas stream with an inert carrier gas, such as oxygen-free nitrogen to facilitate flow of the gaseous products from the reactor to the condensing trap. Alternatively, gas flow to the trap may be speeded up by injecting an inert gas between the product end of the reactor and the condensing trap. Such an inert gas must remain volatile at the low temperatures employed to condense the reaction products.

It is important to the method of the present invention that the relative concentrations of hydrogen chloride and silicon tetrafluoride in the reaction zone be controlled within certain limits. We have observed that the greater the concentration of hydrogen chloride relative to silicon tetrafluoride in the reaction zone, the greater the proportion of silanes, or compounds containing the Si—H linkage in the products. However, if the concentration of silicon tetrafluoride is not sufficiently high, the silanes will not be fluorinated to the desired extent. On the other hand, if the concentration of silicon tetrafluoride is high relative to hydrogen chloride, there will be a higher degree of fluorination of silanes formed, but the formation of silicon chlorofluorides relative to silanes will be greatly increased. Satisfactory yields of fluorinated chloromonosilanes are obtained when the mole ratio of hydrogen chloride to silicon tetrafluoride is about 1:1 to 5:1, and preferably about 3:1. The fluorinated chloromonosilanes, $SiHClF_2$ (B. P. −50° C.) and $SiHCl_2F$ (B. P. −18° C.), are separated from the other compounds formed during the reaction (B. P. −70° to +57° C.) by low temperature fractionation.

The method of the present invention is further illustrated by the following non-limiting example.

Example

A vertical glass tube one inch in diameter which served as the reaction zone was provided with 95 g. of through 20 and on 40 mesh silicon. The thickness of the silicon bed in the tube was approximately six inches. The exit end of the tube was connected to a low temperature condensing trap. A stream of oxygen-free nitrogen at the rate of about 50 cc./min. was passed through the reaction zone during which time the silicon bed was heated in an electric tube furnace to about 300° C. Upon reaching 300° C., the nitrogen stream was augmented by a stream of anhydrous hydrogen chloride at a rate of 75 cc./min. Heating was continued to 425° C. which temperature was maintained throughout the ensuing run.

When the silicon bed temperature reached 425° C., the nitrogen flow was stopped and anhydrous silicon tetrafluoride at the rate of 25 cc./min. was introduced with the hydrogen chloride. The product end of the reaction tube was then attached to the product condensing trap cooled with liquid nitrogen. The above flow rates of hydrogen chloride and silicon tetrafluoride corresponding to a mole ratio of HCl/SiF$_4$ of about 3:1 were maintained and the reaction products were collected in the trap for 60 minutes. The gaseous reactants were in contact with the silicon bed for approximately 30–40 seconds.

The products from the trap were separated by efficient low temperature distillation. The fraction boiling below $-85°$ C. consisted of a small quantity of unreacted SiF$_4$. The next fraction, $-85°$ to $-63°$, contained approximately 200 cc. (25° C.) of SiClF$_3$ (B. P. $-70°$ C.), which was positively identified by a molecular weight determination. Approximately one-half of the fraction collected over the range $-63°$ to $-39°$ contained approximately 100 cc. (25° C.) which distilled at $-54°$ to $-49°$ C. and was identified as SiHClF$_2$ from its reported boiling point of $-50°$ C. SiCl$_2$F$_2$ (B. P. $-31.5°$ C.) was identified in the next fraction taken off at $-39°$ to $-23°$ C.

Approximately 240 cc. (25° C.) distilled at $-17°$ to $-16°$ C. in the fraction taken off at $-23$ to $-15°$ C., which volume comprised nearly ¾ of this fraction. This material was identified as SiHCl$_2$F (B. P. $-18.4°$ C.). The identity of the compound was confirmed by a molecular weight determination of 121, which corresponds within the limits of experimental error to its actual molecular weight of 119. Hydrolysis of the compound gave a Si:Cl:F ratio of approximately 1:2:1. Furthermore, an infra-red spectra of the compound contained the adsorptive bands characteristic of Si—H, and indicated that SiCl$_2$F$_2$, SiCl$_3$F and SiHCl$_3$ were not present.

The still residue, boiling above $-15°$ C. contained SiHCl$_3$, and SiCl$_3$F and SiCl$_4$.

We claim:

1. A method of preparing fluorinated chloromonosilanes of the general formula SiHCl$_x$F$_y$, where $x$ and $y$ are whole numbers and their sum is equal to 3, which comprises contacting under anhydrous conditions a finely divided silicon metal-containing mass simultaneously with hydrogen chloride and silicon tetrafluoride by passing a gaseous mixture consisting essentially of hydrogen chloride and silicon tetrafluoride over said silicon mass at a temperature of 385°–525° C., the mole ratio of hydrogen chloride to silicon tetrafluoride in said gaseous mixture being at least 1:1 and not more than about 5:1, condensing the reaction products, and separating fluorinated chloromonosilanes therefrom.

2. A method of preparing SiHCl$_2$F which comprises forming an anhydrous gaseous mixture comprising hydrogen chloride and silicon tetrafluoride in mole ratio of hydrogen chloride to silicon tetrafluoride of about 1:1 to 5:1, contacting said gaseous mixture with a finely divided silicon metal-containing mass at 385°–525° C., condensing the reaction products, and separating SiHCl$_2$F therefrom.

3. The method set forth in claim 2 wherein the hydrogen chloride to silicon tetrafluoride mole ratio in the gaseous mixture is about 3:1.

4. The method set forth in claim 2 wherein the gaseous mixture is contacted with the silicon metal-containing mass at about 400°–500° C.

References Cited in the file of this patent

UNITED STATES PATENTS

| | | |
|---|---|---|
| 2,395,826 | Hill et al. | Mar. 5, 1946 |
| 2,595,620 | Wagner | May 6, 1952 |

OTHER REFERENCES

Rochow: "Chemistry of the Silicones," 2nd edition, 1951, page 7.